April 25, 1939.  M. KLEIN ET AL  2,155,603
NONREMOVABLE CHART HOLDER.
Filed March 16, 1937
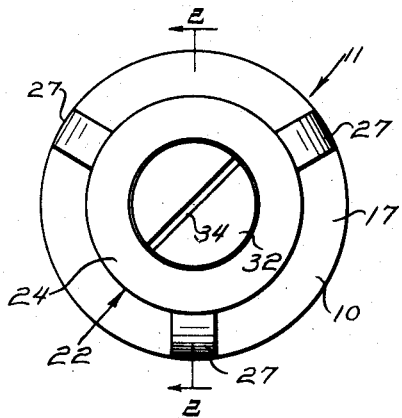
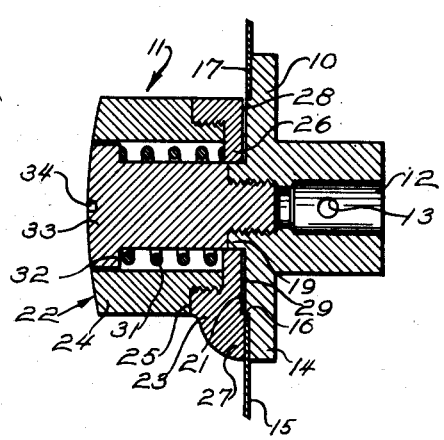
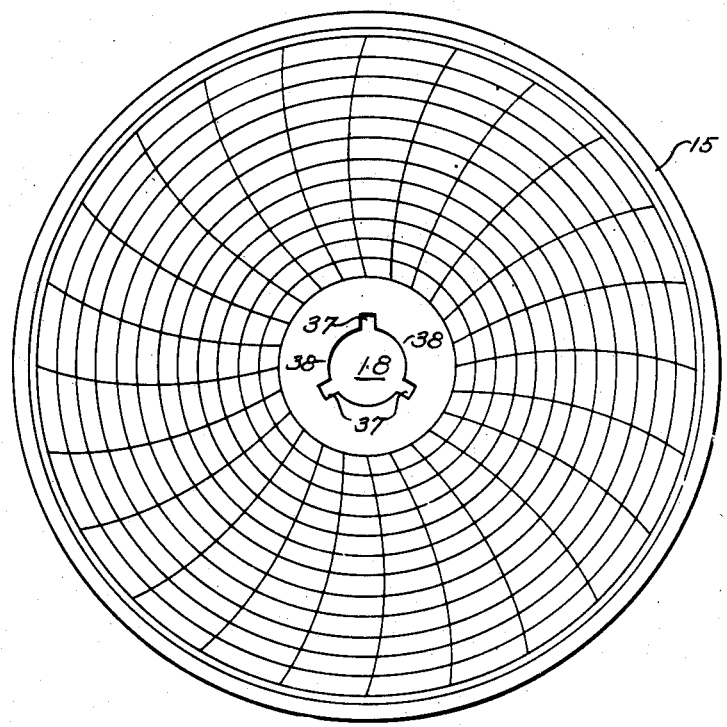
Inventor
Maximilian Klein
Ernest H. Grauel
Strauch & Hoffman
Attorneys Patented Apr. 25, 1939

2,155,603

UNITED STATES PATENT OFFICE 2,155,603

NONREMOVABLE CHART HOLDER

Maximilian Klein, Sellersville, and Ernest H. Grauel, Perkasie, Pa., assignors to United States Gauge Company, Sellersville, Pa., a corporation of Pennsylvania Application March 16, 1937, Serial No. 131,264

3 Claims. (Cl. 234—75)

The present invention relates to chart holders for use on recording gauges or like instruments. More specifically the present invention relates to novel improvements in chart holders of the character referred to wherein the holding means is permanently attached to the recorder and designed to readily receive a chart and yieldingly hold it in operative position on the recorder.

The primary object of the present invention resides in the provision of an efficient chart holder which is nonremovably associated with the recorder so as to prevent its accidental loss as an incident to its manipulation when a chart sheet is removed or applied to the recorder.

A further important object of the present invention resides in providing a non-removable chart holder with means to insure proper gripping of a chart sheet with minimum attention on the part of the attendant.

Another object of the present invention resides in providing a chart holder wherein the necessity of screwing the gripping members into tight engagement is eliminated.

A further object of the present invention resides in providing a chart holder made up of relatively few and simple parts which are unlikely to get out of order and prevent proper gripping of the chart sheet.

Other objects will appear from the appended claims and the following detailed description taken in connection with the attached drawing wherein:

Figure 1 is an enlarged plan view of the retainer of the present invention.

Figure 2 is a sectional view taken on line 2—2 of Figure 1 showing a chart sheet clamped in place by the chart holder of Figure 1.

Figure 3 is a plan view of a chart sheet adapted for use with the retainer of the present invention and having a central opening of special configuration.

With continued reference to the drawing wherein like reference numerals are used to indicate the same parts in the several views, the numeral 10 indicates the hub or supporting member of the chart holder designated as a whole by the numeral 11.

Hub 10 is provided with a central bore 12 which is adapted to receive the spindle of the clock mechanism of a recording gauge or the like (not shown). A cross passage 13 is provided for the reception of a driving pin (not shown) whereby the hub 10 is connected for rotation by the clock mechanism. It is to be understood that the described manner of connecting the hub and spindle is illustrative only and that any other suitable means of connecting the hub to the clock mechanism may be resorted to in lieu thereof.

A flange 14 designed to receive a chart indicated by numeral 15 is integrally formed on hub 10. In order that chart 15 may be properly centered with respect to hub 10, a shallow shoulder 16 is provided on the face 17 of flange 14. Shoulder 16, as seen in Figure 2, is equal in diameter and of identical configuration as the opening 18 provided in chart 15.

A centrally disposed tapped boss 19 is also provided on hub 10. Boss 19, the purpose of which will be hereinafter pointed out, is concentrically arranged with respect to hub 10 and shoulder 16 and preferably extends slightly beyond the surface 21 provided by the formation of shoulder 16.

A sleeve-like member 22 made up of members 23 and 24 connected by threads 25 is associated with hub 10. Member 23 is provided with an internal flange or formation 26 designed to snugly fit the periphery of boss 19. Due to this complementary arrangement of flange 26 and boss 19, member 22 is positioned in concentric relation with hub 10 and the formations thereon. Member 23 is also provided with external lugs 27. Any desired number of lugs may be provided although three lugs as shown in the drawings have been found quite efficient. Lugs 27 preferably have a maximum diameter equal to the diameter of flange 14 and a minimum diameter equal to the diameter of the aperture 18. Lugs 27 furthermore extend slightly beyond surface 28 of member 23 so as to leave a slight clearance 29 between surfaces 21 and 28 as shown in Figure 2. Clearance 29 insures proper engagement of lugs 27 and chart 15 so as to firmly grip chart 15 between surface 17 and the lugs. If desired, surface 17 and the under surface of lugs 27 may be roughened slightly to prevent relative slippage of chart 15 and the chart holder 11 during normal use of the recorder. Members 23 and 24 are formed with a maximum external diameter equal or slightly less than aperture 18 of chart 15.

Since chart 15 should be firmly gripped between surface 17 and lugs 27 and in view of the fact that an attendant may be careless in seeing that these surfaces are in close juxtaposition, the present invention provides automatic means for firmly gripping the chart. This means comprises a coil spring 31 designed to have one end abut flange 26. The other end of spring 31 abuts the enlarged head 32 of a threaded member 33 which is screw threadedly engaged in tapped boss 19. A kerf 34 is provided in head 32 for the reception of a screw driver for tightly assembling member 33. Any other suitable means may be provided for threading member 33 in place.

It is to be understood that spring 31 is normally of a length somewhat in excess of the distance between flange 26 and head 32 so that the spring will be under slight compression after member 33 is screwed home in boss 19.

In addition to automatically effecting a gripping action between surface 17 and lugs 27, spring 31 and member 33 retain member 22 and hub 10 in assembled relation. These members, however, are capable of relative movement both in an axial and rotative direction. This relative movement is provided by spring 31 and permits ready assembly of chart 15 without necessitating removal of member 22 and the consequent possibility of accidental loss of the member when a chart is to be placed on the recorder.

In order that a chart 15 may be conveniently used with the holder of the present invention, the chart in the region of aperture 18 is provided with recesses or notches 37 corresponding in size and number with lugs 27. Tabs 38 between notches 37 provide the necessary chart surface to be gripped between surface 17 and lugs 27.

A chart is assembled on a recorder having the chart holder of the present invention secured to its spindle by telescoping the chart over member 22 with notches 37 aligned with lugs 27. Tabs 38, accordingly, are brought into engagement with surface 17 of hub 10 and member 22 is grasped and drawn away from hub 10 and rotated a fraction of a turn and released. Spring 31, which is still further compressed by the axial movement of member 22, then causes member 22 to fly back toward hub 10 and grip the tabs 38 between surface 17 and lugs 27. The present invention, accordingly, provides a simple and efficient non-removable automatically gripping chart holder having relatively few parts which are rugged and not likely to get out of order in use.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A chart holder for recording gauges comprising a hub having a centrally disposed concentric recess in one end of said hub for receiving the spindle of a recording gauge clock mechanism, a concentric flange formed on said hub, a concentric shoulder provided on said flange for centering a chart sheet, a centrally disposed concentric tapped boss formed on said hub, a sleeve having an inwardly extending flange thereon for snugly fitting said boss and centering said sleeve with its outer surface in alignment with said shoulder, a threaded member screw-threadedly engaging said tapped boss and including an enlarged head portion loosely fitting the bore of said sleeve, said threaded member and said sleeve providing an annular space therebetween, a coil spring disposed in said annular space and surrounding said main body portion of said threaded member with its opposite ends in engagement with said inwardly extending flange and said enlarged head respectively, whereby said sleeve is mounted for relative axial and rotational movement with respect to said hub, and rigid outwardly extending lugs on said sleeve for clamping a portion of a chart against said concentric flange under influence of said spring whereby said chart is resiliently retained against relative movement with respect to said holder.

2. A chart holder for recording gauge charts, comprising a hub formed to fit on a spindle of the recorder, a flange on said hub for receiving a portion of a chart, a tapped boss on said hub, a sleeve-like member having an inwardly extending annular flange for snugly engaging said boss and positioning said member with respect to said hub and flange, a plurality of outwardly extending rigid lugs on said member for gripping said portion of said chart between said first-mentioned flange and said lugs, a screw-threaded member having an enlarged head threaded into said boss, and resilient means having one end in engagement with said inwardly extending flange and its other end in engagement with said enlarged head to urge said member toward said flange and to mount said member for axial and rotational movement with respect to said hub whereby said member may be manipulated to yieldingly secure said chart and holder against relative movement during normal operation of said recorder.

3. In combination, a chart having a central opening and a plurality of notches extending into said opening; a chart holder having an annular flange for supporting the portions of said chart between said notches and a concentric member extending through said central opening; a sleeve-like member surrounding said concentric member and having a plurality of rigid outwardly extending lugs thereon for cooperation with the notches in said chart when the chart is brought into its initial assembled relation with respect to said hub and sleeve-like member and for engaging said portions of said chart upon axial and rotational movement of said member, and resilient means engaging said concentric member and said sleeve-like member for urging said sleeve-like member toward said annular flange to yieldingly grip said portions of said chart between said lugs and said annular flange to prevent relative movement of said chart and said holder.

MAXIMILIAN KLEIN.
ERNEST H. GRAUEL.